US012493994B2

(12) United States Patent
Nguyen Canh et al.

(10) Patent No.: US 12,493,994 B2
(45) Date of Patent: Dec. 9, 2025

(54) METHOD AND APPARATUS TO ENCODE SYMMETRY MESH WITH MULTIPLE SYMMETRY PLANES

(71) Applicant: TENCENT AMERICA LLC, Palo Alto, CA (US)

(72) Inventors: Thuong Nguyen Canh, San Bruno, CA (US); Xiaozhong Xu, Palo Alto, CA (US); Fang-Yi Chao, Palo Alto, CA (US); Chao Huang, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 287 days.

(21) Appl. No.: 18/457,811

(22) Filed: Aug. 29, 2023

(65) Prior Publication Data
US 2024/0273771 A1  Aug. 15, 2024

Related U.S. Application Data

(60) Provisional application No. 63/444,884, filed on Feb. 10, 2023.

(51) Int. Cl.
G06T 9/00 (2006.01)
G06T 17/20 (2006.01)

(52) U.S. Cl.
CPC ............ *G06T 9/001* (2013.01); *G06T 17/205* (2013.01); *G06T 2210/12* (2013.01)

(58) Field of Classification Search
None
See application file for complete search history.

(56) References Cited

U.S. PATENT DOCUMENTS

| | | | | |
|---|---|---|---|---|
| 6,982,710 B2 * | 1/2006 | Salomie | ................. | G06T 17/20 345/420 |
| 12,243,277 B2 * | 3/2025 | Nguyen Canh | ...... | H04N 19/119 |
| 12,243,279 B2 * | 3/2025 | Nguyen Canh | ...... | H04N 19/136 |
| 2006/0078172 A1 * | 4/2006 | Zhang | ................. | G06V 40/168 382/118 |
| 2020/0058160 A1 | 2/2020 | McCrae et al. | | |
| 2023/0030913 A1 | 2/2023 | Mammou et al. | | |

(Continued)

OTHER PUBLICATIONS

International Search Report dated Jan. 4, 2024 in Application No. PCT/US23/31627.

(Continued)

*Primary Examiner* — Anand P Bhatnagar
(74) *Attorney, Agent, or Firm* — Sughrue Mion, PLLC

(57) ABSTRACT

A method performed by at least one processor of an encoder includes bounding a mesh via a bounding box; partitioning the mesh via a global symmetry plane that partitions the mesh into a first side and a second side that is opposite to the first side; dividing the mesh into a plurality of slices; determining a local symmetry plane for each slice based on the global symmetry plane; based on a determination that a vertex merging condition is satisfied for a first slice from the plurality of slices that shares a boundary with a second slice from the plurality of slices, merging one or more vertices in the boundary of the second slice with one or more vertices in the boundary of the first slice; and encoding each slice from the plurality of slices as a respective sub-mesh of the mesh.

20 Claims, 9 Drawing Sheets

(56) References Cited

U.S. PATENT DOCUMENTS

| | | | |
|---|---|---|---|
| 2024/0087173 A1* | 3/2024 | Nguyen Canh | H04N 19/597 |
| 2024/0127490 A1* | 4/2024 | Nguyen Canh | H04N 19/167 |
| 2024/0135593 A1* | 4/2024 | Nguyen Canh | G06T 9/001 |
| 2024/0153149 A1* | 5/2024 | Nguyen Canh | G06T 9/001 |
| 2024/0202980 A1* | 6/2024 | Nguyen Canh | G06T 9/001 |
| 2024/0312066 A1* | 9/2024 | Nguyen Canh | G06T 9/001 |

OTHER PUBLICATIONS

Written Opinion of the Internaltional Searching Authority dated Jan. 4, 2024 in Application No. PCT/US23/31627.

* cited by examiner

| | | Descriptor | | | | | | | | | | |
|---|---|---|---|---|---|---|---|---|---|---|---|---|
| symmetry_plane_parameter_set() { | | | | | | | | | | | | |
|   for ( i = 0; i < 4; i++ ) { | | | | | | | | | | | | |
|     sym_plane [0][i] /* θ_i */ | | i($b_0$) | | | | | | | | | | |
|   } | | | | | | | | | | | | |
|   num_symm_plane_minus1 /* K − 1 */ | | | | u($b_1$) | | | | | | | | |
|   for ( i = 1; i <= num_symm_plane_minus1; i++ ) { | | | | | | | | | | | | |
|     for( j = 0; j < 4; j++ ) { | | | | | | | | | | | | |
|       symm_plane[i][j] = symm_plane[i][j] − symm_plane[i-1][j] | | | | | | i($b_2$) | | | | | | |
|     } | | | | | | | | | | | | |
|   } | | | | | | | | | | | | |
|   for(i=0; i < num_symm_plane_minus1; i++) { | | | | | | | | | | | | |
|     boundary_symm_replace_flag[i] | | | | | | | | | | 1b | | |
|   } | | | | | | | | | | | | |
| } | | | | | | | | | | | | |

FIG. 7

METHOD AND APPARATUS TO ENCODE SYMMETRY MESH WITH MULTIPLE SYMMETRY PLANES

CROSS-REFERENCE TO RELATED APPLICATION

This application claims priority from U.S. Provisional Application No. 63/444,884 filed on Feb. 10, 2023, the disclosure of which is incorporated herein by reference in its entirety.

FIELD

This disclosure is directed to a set of advanced video coding technologies. More specifically, the present disclosure is directed to encoding a mesh with multiple symmetry planes.

BACKGROUND

VMesh is an ongoing MPEG standard to compress dynamic meshes. The current VMesh reference software compresses meshes based on decimated base meshes, displacement vectors and motion fields. The displacements are calculated by searching the closest point on the input mesh with respect to each vertex of the subdivided based mesh. To encode the displacement, displacement vectors are transformed into wavelet coefficients by a linear lifting scheme, and then the coefficients are quantized and coded by a video codec or arithmetic codec. This process also refines the base mesh to minimize the displacement. Texture transfer may be performed to match the texture with reparameterized geometry and UV as well as optimized texture for image compression.

Reflection symmetry is a popular characteristic of mesh coding, especially computer generated meshes. Symmetry was utilized to compress symmetry mesh. Vertices are divided into a left and right part of a symmetry plane. The left part is encoded by mesh coding while the right part is encoded by a symmetry prediction and displacement coding. Even though the texture coordinate (or UV attribute) also has a certain level of symmetry, the texture coordinate may exhibit different symmetrical properties in transition and rotation.

However, texture coordinate compression for symmetry mesh has yet to be exploited. Existing mesh coding algorithms mainly exploit local characteristics of meshes. Many meshes are not perfect in reflection symmetry, where one mesh may exhibit symmetry only in a portion of the mesh.

SUMMARY

According to one or more embodiments, a method performed by at least one processor of an encoder comprises bounding a mesh via a bounding box that comprises a first bounding plane and a second bounding plane such that the bounding box encloses the mesh. The method includes partitioning the mesh via a global symmetry plane that partitions the mesh into a first side and a second side, that global symmetry plane perpendicular to the first bounding plane and the second bounding plane. The method includes dividing the mesh into a plurality of slices, each slice perpendicular to the global symmetry plane. The method includes determining a local symmetry plane for each slice based on the global symmetry plane. The method includes, based on a determination that a vertex merging condition is satisfied for a first slice from the plurality of slices that shares a boundary with a second slice from the plurality of slices, merging one or more vertices in the boundary of the second slice with one or more vertices in the boundary of the first slice. The method further includes encoding each slice from the plurality of slices as a respective sub-mesh.

According to one or more embodiments, an encoder comprises: at least one memory configured to store program code; and at least one processor configured to read the program code and operate as instructed by the program code. The program code comprises: bounding code configured to cause the at least one processor to bound a mesh via a bounding box that comprises a first bounding plane and a second bounding plane such that the bounding box encloses the mesh, partitioning code configured to cause the at least one processor to partition the mesh via a global symmetry plane that partitions the mesh into a first side and a second side, that global symmetry plane perpendicular to the first bounding plane and the second bounding plane, dividing code configured to cause the at least one processor to divide the mesh into a plurality of slices, each slice perpendicular to the global symmetry plane, determining code configured to cause the at least one processor to determine a local symmetry plane for each slice based on the global symmetry plane, first merging code configured to cause the at least one processor to, based on a determination that a vertex merging condition is satisfied for a first slice from the plurality of slices that shares a boundary with a second slice from the plurality of slices, merge one or more vertices in the boundary of the second slice with one or more vertices in the boundary of the first slice, and encoding code configured to cause the at least one processor to encode each slice from the plurality of slices as a respective sub-mesh.

According to one or more embodiments, a non-transitory computer readable medium having instructions stored therein, which when executed by a processor of an encoder, cause the processor to execute a method that comprises bounding a mesh via a bounding box that comprises a first bounding plane and a second bounding plane such that the bounding box encloses the mesh. The method includes partitioning the mesh via a global symmetry plane that partitions the mesh into a first side and a second side, that global symmetry plane perpendicular to the first bounding plane and the second bounding plane. The method includes dividing the mesh into a plurality of slices, each slice perpendicular to the global symmetry plane. The method includes determining a local symmetry plane for each slice based on the global symmetry plane. The method includes, based on a determination that a vertex merging condition is satisfied for a first slice from the plurality of slices that shares a boundary with a second slice from the plurality of slices, merging one or more vertices in the boundary of the second slice with one or more vertices in the boundary of the first slice. The method further includes encoding each slice from the plurality of slices as a respective sub-mesh.

BRIEF DESCRIPTION OF THE DRAWINGS

Further features, the nature, and various advantages of the disclosed subject matter will be more apparent from the following detailed description and the accompanying drawings in which:

FIG. 7 illustrates an example syntax table and algorithm for signaling sub-mesh boundaries, in accordance with embodiments of the present disclosure.

DETAILED DESCRIPTION

Figure 1:
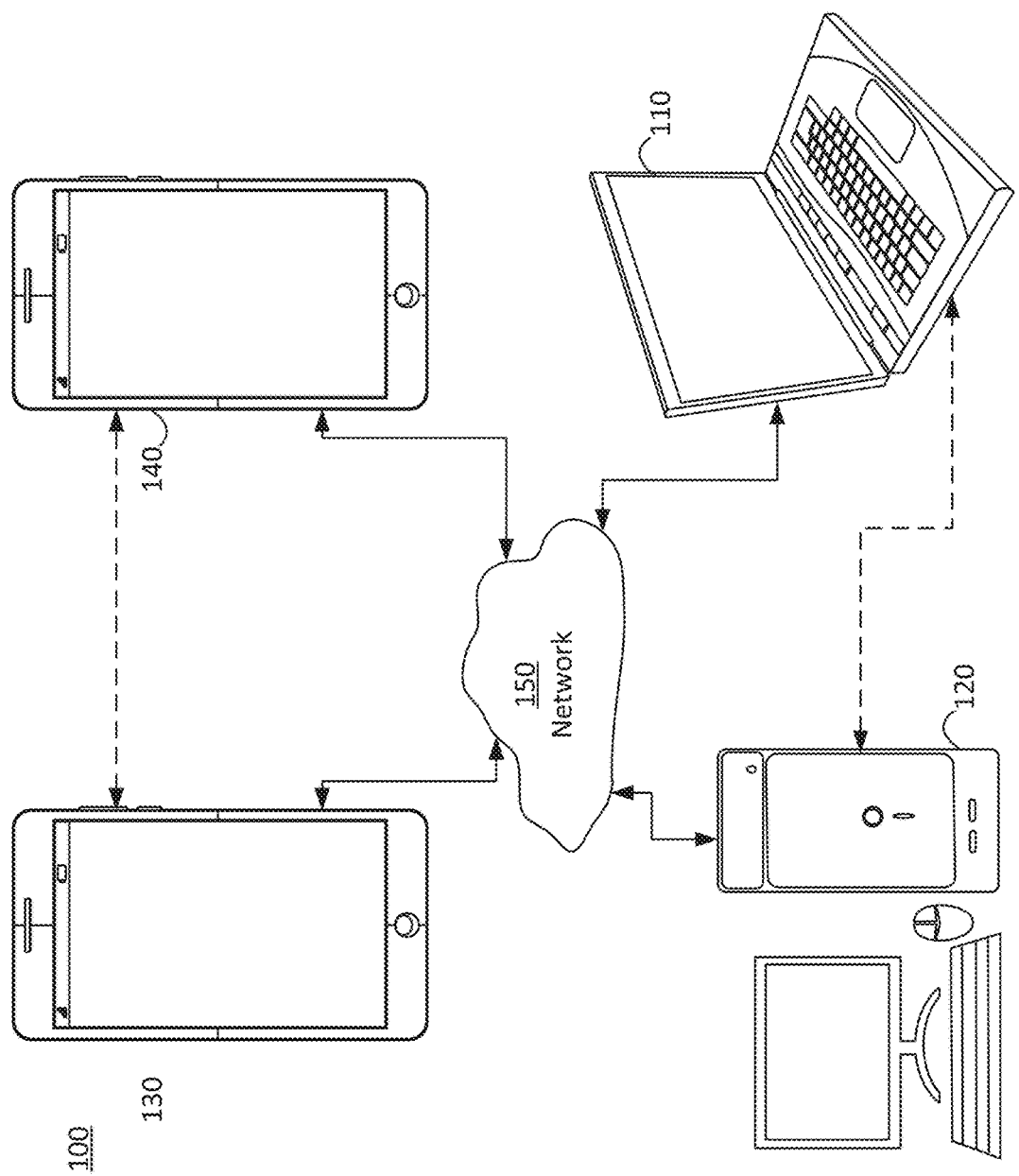
FIG. 1 is a schematic illustration of a block diagram of a communication system, in accordance with embodiments of the present disclosure.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

Figure 2:
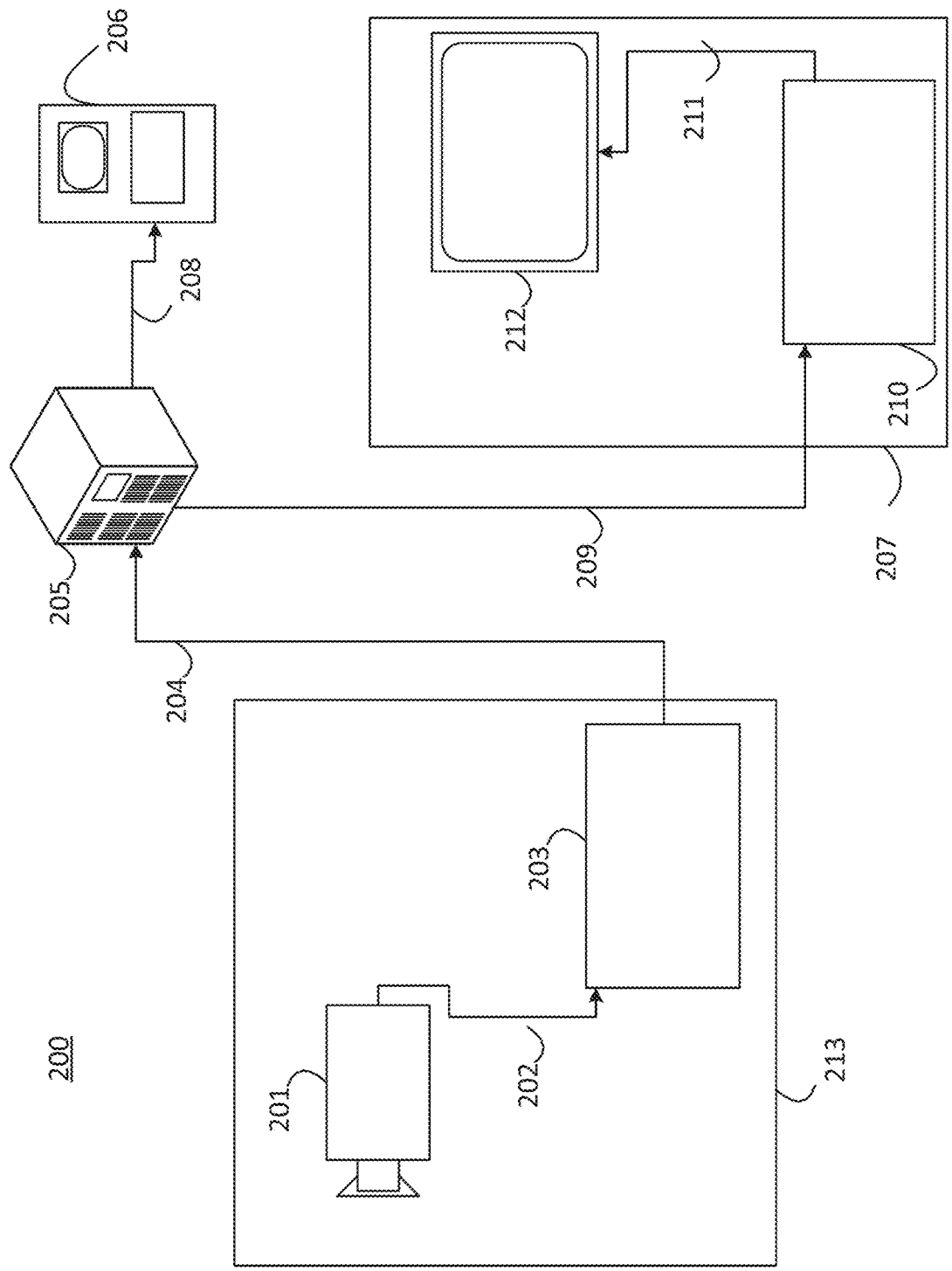
FIG. 2 is a schematic illustration of a block diagram of a streaming system, in accordance with embodiments of the present disclosure.

With reference to FIGS. 1-2, one or more embodiments of the present disclosure for implementing encoding and decoding structures of the present disclosure are described.

FIG. 1 illustrates a simplified block diagram of a communication system 100 according to an embodiment of the present disclosure. The system 100 may include at least two terminals 110, 120 interconnected via a network 150. For unidirectional transmission of data, a first terminal 110 may code video data, which may include mesh data, at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 may be, for example, servers, personal computers, and smart phones, and/or any other type of terminals. For example, the terminals (110-140) may be laptop computers, tablet computers, media players and/or dedicated video conferencing equipment. The network 150 represents any number of networks that convey coded video data among the terminals 110-140 including, for example, wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

FIG. 2 illustrates, as an example of an application for the disclosed subject matter, a placement of a video encoder and decoder in a streaming environment. The disclosed subject matter may be used with other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that includes a video source 201 and an encoder 203. The streaming system 200 may further include at least one streaming server 205 and/or at least one streaming client 206.

The video source 201 may create, for example, a stream 202 that includes a 3D mesh and metadata associated with the 3D mesh. The video source 201 may include, for example, 3D sensors (e.g. depth sensors) or 3D imaging technology (e.g. digital camera(s)), and a computing device that is configured to generate the 3D mesh using the data received from the 3D sensors or the 3D imaging technology. The sample stream 202, which may have a high data volume when compared to encoded video bitstreams, may be processed by the encoder 203 coupled to the video source 201. The encoder 203 may include hardware, software, or a combination thereof to enable or implement aspects of the disclosed subject matter as described in more detail below. The encoder 203 may also generate an encoded video bitstream 204. The encoded video bitstream 204, which may have a lower data volume when compared to the uncompressed stream 202, may be stored on a streaming server 205 for future use. One or more streaming clients 206 and 207 may access the streaming server 205 to retrieve video bit streams 208 and 209, respectively, that may be copies of the encoded video bitstream 204.

The streaming client 207, for example, may include a video decoder 210 and a display 212. The video decoder 210 may, for example, decode video bitstream 209, which is an incoming copy of the encoded video bitstream 204, and create an outgoing video sample stream 211 that may be rendered on the display 212 or another rendering device. In some streaming systems, the video bitstreams 204, 208, and 209 may be encoded according to certain video coding/compression standards.

A mesh may be a collection of vertices, edges, and faces that define a shape or an object. A 3D mesh may include a plurality of vertices, with each vertex associated with a 3D coordinate in a 3D space (e.g., x, y, z). A 2D mesh may include a plurality of vertices with each vertex associated a 2D coordinate in a 2D space (e.g., x and y). The vertices may be connected to form edges, where a collection of vertices may define a face.

Figure 3:
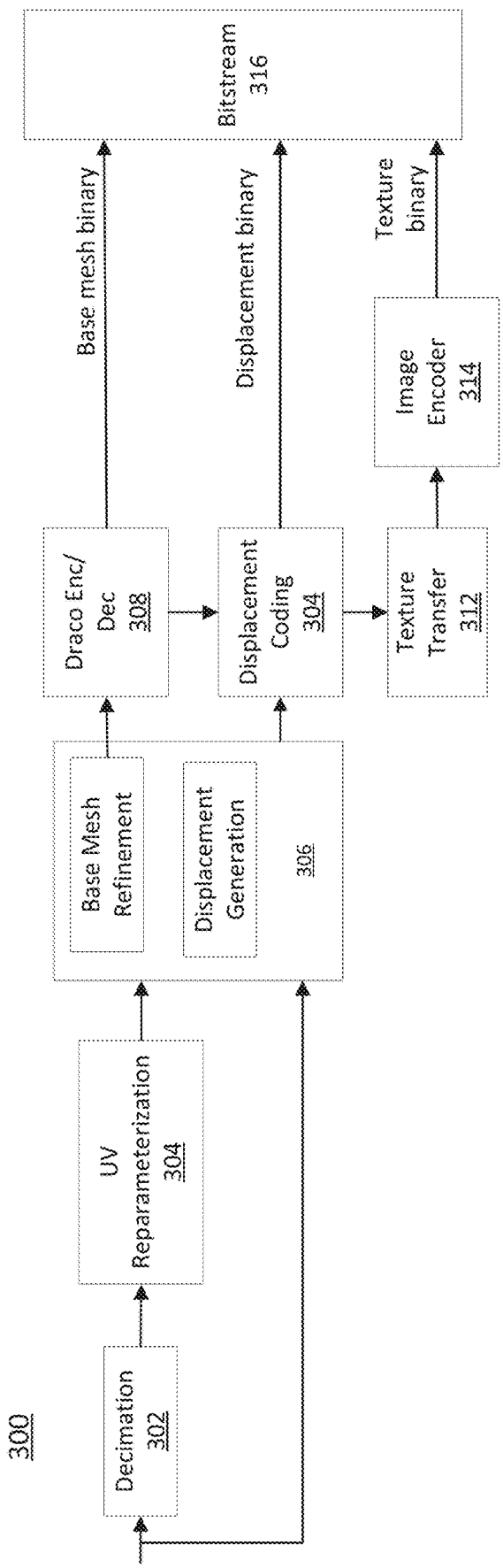
FIG. 3 is a schematic illustration of an example mesh encoder, in accordance with embodiments of the present disclosure.

FIG. 3 illustrates an example mesh encoder 300. The encoder 300 may perform the V-DMC process for performing decimation and reparameterization before encoding a bitstream. As illustrated in FIG. 3, an input mesh may be subject to decimation 302 and UV reparameterization 304. Subsequently geometry reparameterization 306 is performed that includes base mesh refinement and displacement generation. The output of the base mesh refinement is provided to a Draco encoder 308 to generate a base mesh binary. The output of the displacement generation is provided to displacement coding 310 to generate displacement binary. The output of displacement coding 310 is provided to texture transfer 312 and image encoder 314 to generate texture binary. The base mesh binary, texture binary, and displacement binary may be included in bitstream 316.

Embodiments of the present disclosure are directed to a method to compress symmetry mesh with multiple symmetry planes including a method to cut symmetry mesh to multiple sub-meshes with multiple symmetry planes, and a method to encode multiple symmetry planes and joint sub-meshes at the decoder side. By segmenting a mesh into multiple symmetry planes, similar slices and vertices may be combined, thereby reducing the amount of information to be compressed.

The proposed methods may be used separately or combined in any order and may be used for arbitrary polygon meshes. In one or more examples, a mesh is assumed to be fully or partially symmetric in geometry. In one or more examples, symmetry coding is assumed to use half of a full mesh (e.g., left side of mesh) to predict the remainder of the mesh (e.g., right side of mesh).

Figure 4:
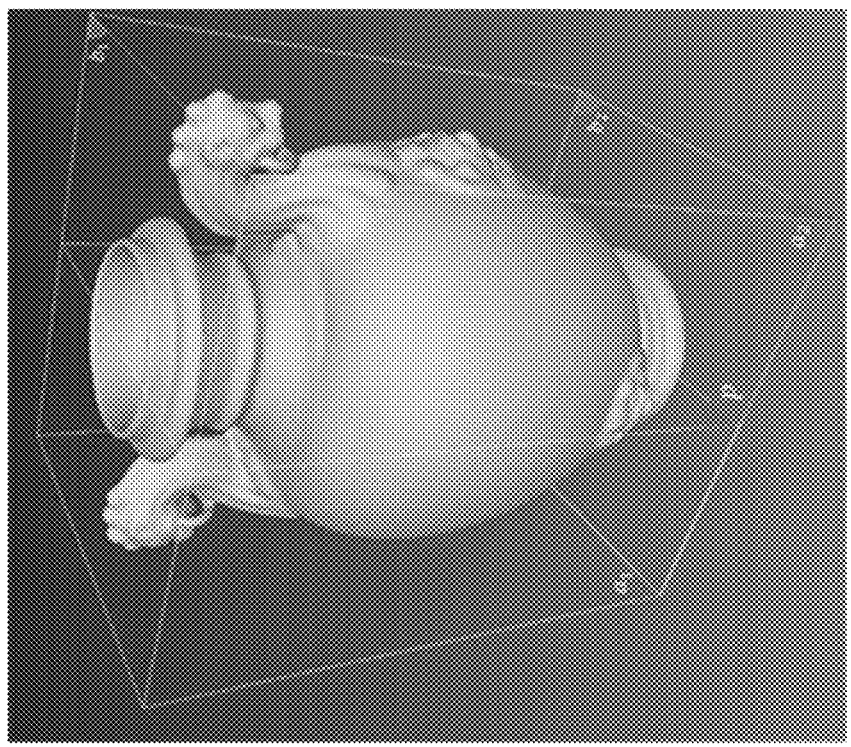
FIG. 4 is a schematic illustration of a bounding box and symmetry plane on a mesh object, in accordance with embodiments of the present disclosure.

According to one or more embodiments, a method derives multiple symmetry meshes. FIG. 4 illustrates an example mesh $\mathcal{M}$ with a global reflection symmetry plane p.

In a first operation, a bounding box following the symmetry plane orientation may be derived with two bounding planes $b_1$, $b_2$ and $a_1$, $a_2$ that are perpendicular to p, as illustrated in FIG. 4. The following operations may be repeated for each bounding plane pair. The perpendicular planes $b_1$, $b_2$ are selected for visualization. However, as understood by one of ordinary skill in the art, the following operations may be applied to a portion of the mesh based on bounding planes $a_1$, $a_2$. A bounding box may be a box that circumscribes an object, as illustrated in FIG. 4. As illustrated in FIG. 4, a bounding box 402 is defined by bounding planes $b_1$, $b_2$ and bounding planes $a_1$, $a_2$. A bounding plane may correspond to a face defined by four vertices, where the face forms part of the bounding box.

In one or more examples, symmetric detection may be performed on mesh $\mathcal{M}$, where an orientation of the mesh having the smallest distortion is selected as the orientation of the mesh for dividing into multiple slices.

Figure 5A:
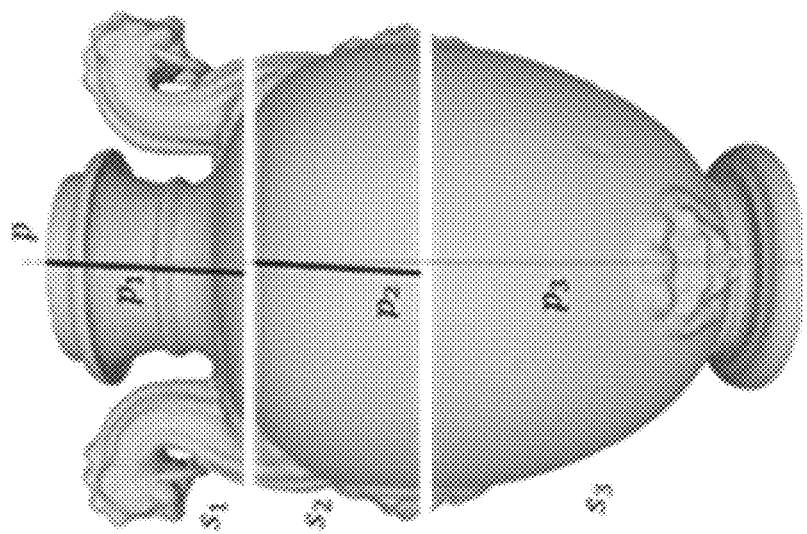
FIGS. 5(A), 5(B), and 5(C) illustrate a mesh object with multiple slices and multiple symmetry planes, in accordance with embodiments of the present disclosure.
Figure 5B:
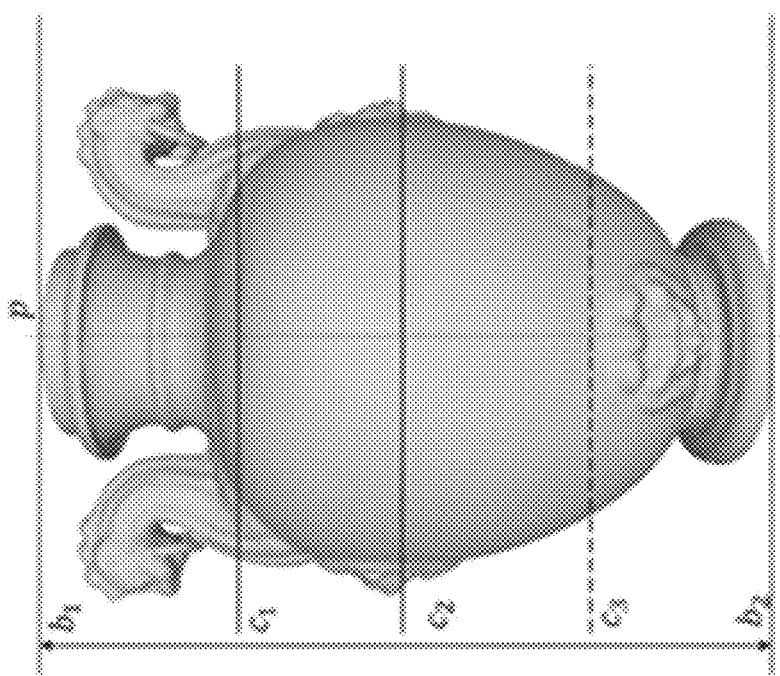

In a second operation, a mesh is divided into n slices based on the orientation of the symmetry plane. For example, FIG. 5(A) illustrates a global partition plane p that partitions the mesh, where the partition plane p is perpendicular to planes $b_1$, $b_2$. As illustrated in FIG. 5(B), each separating plane (e.g., cutting plane $c_i$) slices the mesh into individual slices $s_i$.

Figure 5C:
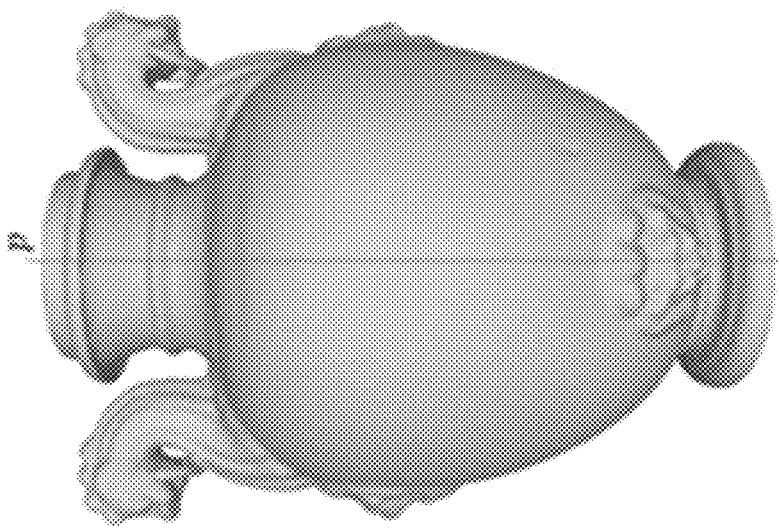

In a third operation, a local symmetry plane $p_i$ is estimated for each slice. Each local symmetry plane $p_i$ may be estimated based on a global symmetry plane p. In one or more examples, a local symmetry plane $p_i$ may be estimated based on the dimensions of an individual slice $s_i$ and the global symmetry plane p. A symmetry plane may be a plane that divides a mesh object into a first side (e.g., left side) and a second side opposite to the left side (e.g., right side). A global symmetry plane may divide an entire mesh object as illustrated in FIG. 5(A). A local symmetry plane may divide an individual slice of a mesh object as illustrated in FIG. 5(C).

In a fourth operation, the mesh is separated into multiple sub-meshes for each slice. For example, each slice $s_i$ corresponds to a respective sub-mesh. As illustrated in FIG. 5(C), a mesh is divided into at least slice $s_1$ and slice $s_2$ with local symmetry planes $p_1$ and $p_2$, respectively. The slices $s_1$ and slice $s_2$ and may each correspond to two different sub-meshes.

According to one or more embodiments, a mesh is divided into n equally spaced slices. The division into slices may be based on the orientation of the symmetry plane. This division may be performed recursively by binary division or quad division, etc. As illustrated in FIG. 5(B), a mesh sub-divided by 3 cutting planes $c_{1,2,3}$.

According to one or more embodiments, a slice merging process may be performed after a mesh is divided into multiple slices. In one or more examples, two or more slices are merged if the difference between the local symmetry planes for this slices is minimal (e.g., less than a threshold). In one or more examples, the condition for determining whether to merge two or more slices may specify that if an angle between the two symmetry planes of two respective slices is smaller than a given threshold $\tau_p$, then the two slices are grouped or merged to one. As illustrated in FIG. 5(C), the last 2 slices may be merged since the symmetry plane is identical to the global symmetry plane $p_3=p$.

According to one or more embodiments, the division may be performed using recursive binary division. For example, each slice is further divided to two equally height until a condition is met. In one or more examples, the condition may specify that the angle between symmetry planes of the two sub-divided slices is smaller than a given threshold $\tau_p$. In one or more examples, the condition may specify that the recursive binary division is performed until a slice is less than or equal to a size threshold.

Figures 6A, 6B, 6C:
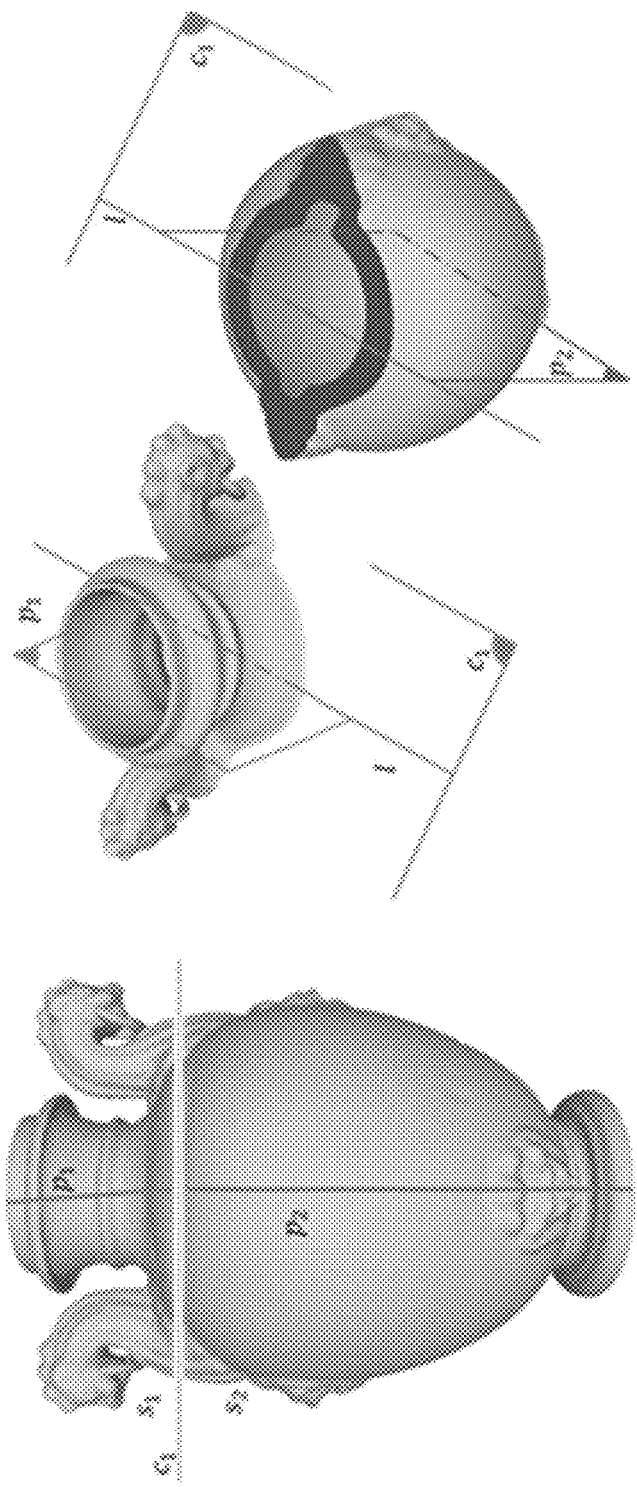
FIGS. 6(A), 6(B), and 6(C) illustrate a mesh object with multiple slices and multiple symmetry planes, in accordance with embodiments of the present disclosure.

According to one or more embodiments, symmetry prediction is performed sequentially with a neighbor plane constraint of all left vertices in a cutting boundary that are the same in both near by segments (e.g., adjacent segments or slices). For example, in FIGS. 6(A)-6(C), two symmetry planes ($p_1$, $p_2$) are intersected at line 1 in cutting plane $c_1$. The left vertices in plane $c_i$ in both sub-meshes are the same. That is, the vertices in two different slices that share a boundary may be the same along the boundary.

In one or more examples, given that a plane $p_i$ and a cutting plane $c_j$ intersect in a line $l_j$, the symmetry plane $p_i+1$ is constrained to include line $l_j$.

According to one or more embodiments, a method to join vertices of two nearby segments or slices (left and right) that share a boundary may be applied. This process may include merging duplicate left vertices and duplicated predicted right vertices.

In one or more examples, if left vertices $v_L$ from an input mesh are boundary vertices between two sub-meshes i, j, two duplicated vertices $v_L^i, v_L^j$ are created. The distances between these vertices may be very small considering a quantization error. In one or more examples, the pair of vertices may be found by applying the nearest distance between vertices of two sub-meshes.

In one or more examples, an index of left vertices may be used to find a corresponding pair in the right vertices of multiple sub-meshes. For example, since symmetry prediction is performed to predict right mesh from left mesh $v_L^i, v_L^j$, the corresponding predicted right vertices are $v_R^i$, $v_R^j$, respectively. Accordingly, these two right vertices may be merged.

In one or more examples, vertices may be kept based on a condition being met. The distortion in each sub-mesh may be different. In one or more examples, when comparing two slices or sub-meshes that share a boundary, the vertices along the boundary from the slice or sub-mesh having the smaller distortion may be kept. For example, if $v_R^i$ is kept, then all connections to $v_R^j$ may be replaced with connections to $v_R^i$.

According to one or more embodiments, when comparing two sub-mesh boundaries two respective sub-meshes, a sub-mesh boundary to-be-kept may be selected with smaller symmetry prediction error. A bitstream may include information indicating the vertices of which sub-meshes are to be kept.

According to one or more embodiments, which predicted sub-mesh boundary to keep may be derived at the decoder side based on the difference between a sub-mesh symmetry plane and the global symmetry plane. In one or more examples, between two nearby sub-meshes $\mathcal{M}_i$, $\mathcal{M}_{i+1}$ (e.g., two sub-meshes that share a boundary) with corresponding symmetry plane $p_i$, $p_{i+1}$, if DIFF($p_i$, p)≤DIFF($p_{i+1}$, p), then predicted boundary vertices of $\mathcal{M}_i$ may be kept, and vice versa. DIFF(x,y) may represent the difference between two symmetry planes. In one or more examples, an angle between two planes is used to determine the different between two symmetry planes.

According to one or more embodiments, a method to signal multiple symmetry planes is provided. The global symmetry plane may be represented by four parameters (a, b, c, d) in the plane equation of ax+by+cz+d=0. The parameter of i-th sliced symmetry planes may be ($a_i$, $b_i$, $c_i$, $d_i$). In one or more examples, the global symmetry plane p may be encoded first as index 0. The index of a slice may follow the order from top to bottom or vice versa. In one or more examples, only the difference between a current and a previous symmetry plane are encoded.

According to one or more embodiments, a bitstream indicates which sub-mesh boundary services are kept. Since a mesh may be sliced based on a perpendicular plane, each sub-mesh may have only 2 neighbor sub-meshes. In addition to a pre-defined encoding order, a one bit flag may be used to signal in the bitstream which sub-mesh boundary services are kept. For example, a sub-mesh processing order may be: $\mathcal{M}_i$, $\mathcal{M}_{i+1}$, $\mathcal{M}_{i+2}$. Accordingly, the signaling bit $b_1$ may define which sub-mesh boundary vertices are kept. For instance, $b_i$=0 means sub-mesh boundary vertices of $\mathcal{M}_i$ is kept and vices versa for $b_i$=1.

FIG. 7 illustrates an example syntax table and algorithm for determining sub-mesh boundaries to be kept. The parameters u(n) may be an unsigned integer using n bits, i(n) may be an integer using n bits, and 1b may be a one bit flag.

In one or more examples, the parameter symm_plane may be a 2D array that stores symmetry information.

In one or more examples, the parameter symm_plane[i][j] may be a j-th parameter of i-th symmetry plane.

In one or more examples, the parameter Num_symm_plane_minus1 may be a number of symmetry planes minus one. This parameter may indicate a number of sub-meshes.

In one or more examples, the parameter boundary_symm_replace_flag may indicate which boundary vertices sub-mesh is kept.

According to one or more embodiments, if a bottom slice has a local symmetry plane with a smaller angle to the global symmetry plane than the top slice, then the index may be from the bottom to top.

Figure 8:
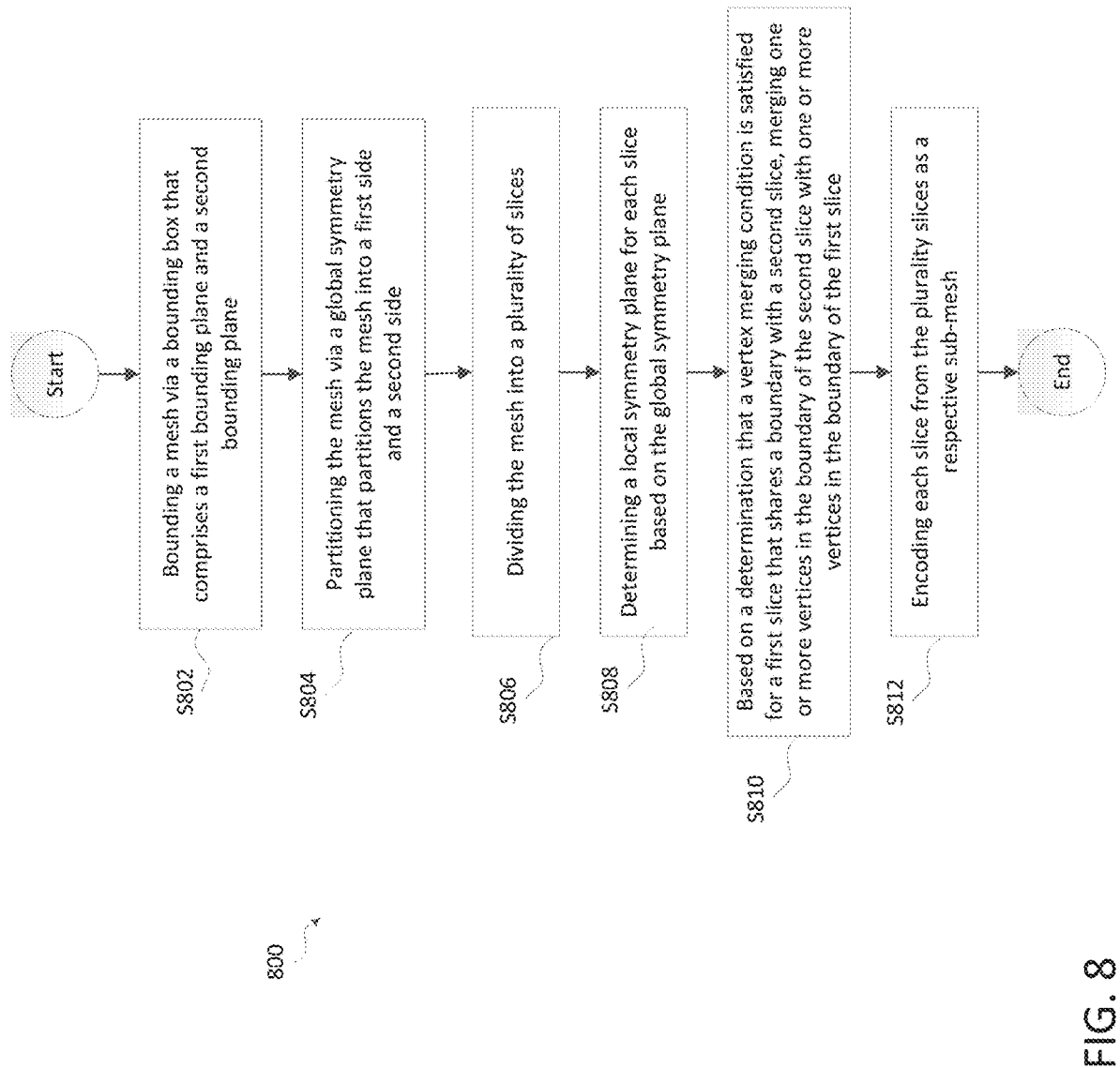
FIG. 8 is a flowchart of an example process for dividing and encoding a mesh, in accordance with embodiment of the present disclosure

FIG. 8 illustrates a flow chart of an example process 800 for dividing and encoding a mesh, in accordance with one or more embodiments. The process 800 may be performed by an encoder such as encoder 203.

The process may start at operation S802 where a mesh is bounded via a bounding box that comprises a first bounding plane and a second bounding plane such that the bounding box encloses the mesh. For example, referring to FIG. 4, a mesh is bounded by a bounding box that includes planes $b_1$, $b_2$.

The process proceeds to operation S804, where a mesh is partitioned via a global symmetry plane that partitions the mesh into a first side and a second side. Referring to FIG. 5(B), the global symmetry plane may be plane p, which is perpendicular to planes $b_1$, $b_2$.

The process may proceed to operation S806, where the mesh is divided into a plurality of slices into a plurality of slices. For example, referring to FIG. 5(C), the mesh is divided into slices $s_i$, where each slice perpendicular to the global symmetry plane p.

The process proceeds to operation S808 where a local symmetry plane for each slice is determined based on the global symmetry plane.

The process proceeds to operation S810 where based on a determination that a vertex merging condition is satisfied for a first slice from the plurality of slices that shares a boundary with a second slice from the plurality of slices, one or more vertices in the boundary of the second slice may be merged with one or more vertices in the boundary of the first slice. In one or more examples, the vertex merging condition is satisfied based on a determination that a distortion of the first slice is less than a distortion of a second slice.

The process proceeds to operation S812 where each slice is encoded as a respective sub-mesh. For example, referring to the algorithm of FIG. 7, a bitstream may indicate which sub-mesh boundaries are kept for the encoded sub-meshes.

The techniques, described above, may be implemented as computer software using computer-readable instructions and physically stored in one or more computer-readable media. For example, FIG. 9 shows a computer system 900 suitable for implementing certain embodiments of the disclosure.

The computer software may be coded using any suitable machine code or computer language, that may be subject to assembly, compilation, linking, or like mechanisms to create code including instructions that may be executed directly, or through interpretation, micro-code execution, and the like, by computer central processing units (CPUs), Graphics Processing Units (GPUs), and the like.

The instructions may be executed on various types of computers or components thereof, including, for example, personal computers, tablet computers, servers, smartphones, gaming devices, internet of things devices, and the like.

Figure 9:
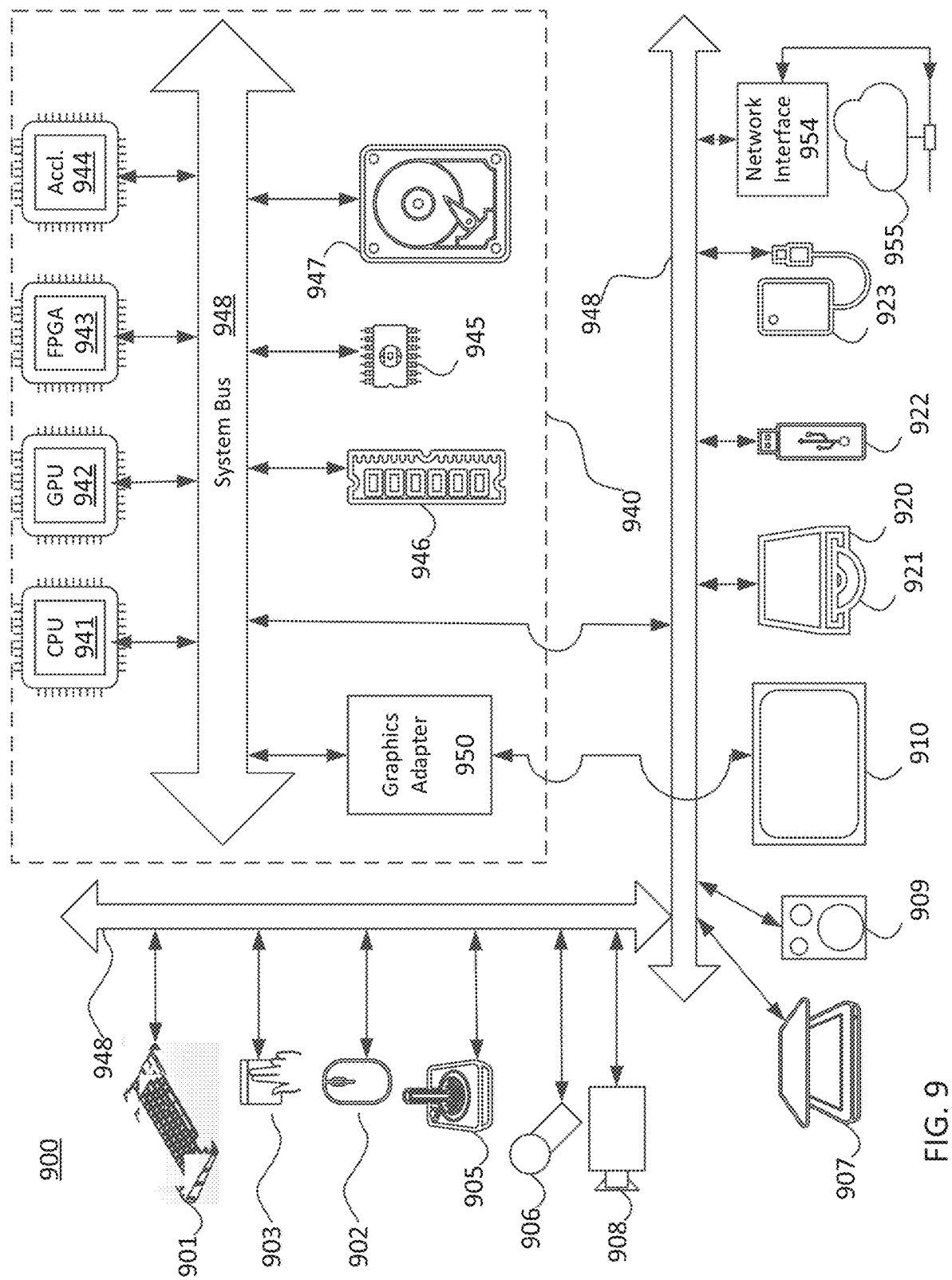
FIG. 9 is a diagram of a computer system suitable for implementing the embodiments of the present disclosure.

The components shown in FIG. 9 for computer system 900 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 900.

Computer system 900 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices may also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 901, mouse 902, trackpad 903, touch screen 910, data-glove, joystick 905, microphone 906, scanner 907, camera 908.

Computer system 900 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 910, data glove, or joystick 905, but there may also be tactile feedback devices that do not serve as input devices). For example, such devices may be audio output devices (such as: speakers 909, headphones (not depicted)), visual output devices (such as screens 910 to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system 900 may also include human accessible storage devices and their associated media such as optical media including CD/DVD ROM/RW 920 with CD/DVD or the like media 921, thumb-drive 922, removable hard drive or solid state drive 923, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 900 may also include interface to one or more communication networks. Networks may be wireless, wireline, optical. Networks may further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 949 (such as, for example USB ports of the computer system 900; others are commonly integrated into the core of the computer system 900 by attachment to a system bus as described below (for example Ethernet interface into a PC computer system or cellular network interface into a smartphone computer system). Using any of these networks, computer system 900 may communicate with other entities. Such communication may be uni-directional, receive only (for example, broadcast TV), uni-directional send-only (for example CANbus to certain CANbus devices), or bi-directional, for example to other computer systems using local or wide area digital networks. Such communication may include communication to a cloud computing environment 955. Certain protocols and protocol stacks may be used on each of those networks and network interfaces as described above.

Aforementioned human interface devices, human-accessible storage devices, and network interfaces 954 may be attached to a core 940 of the computer system 900.

The core 940 may include one or more Central Processing Units (CPU) 941, Graphics Processing Units (GPU) 942, specialized programmable processing units in the form of Field Programmable Gate Areas (FPGA) 943, hardware accelerators for certain tasks 944, and so forth. These devices, along with Read-only memory (ROM) 945, Random-access memory 946, internal mass storage such as internal non-user accessible hard drives, SSDs, and the like 947, may be connected through a system bus 948. In some computer systems, the system bus 948 may be accessible in the form of one or more physical plugs to enable extensions by additional CPUs, GPU, and the like. The peripheral devices may be attached either directly to the core's system bus 948, or through a peripheral bus 949. Architectures for a peripheral bus include PCI, USB, and the like. A graphics adapter 950 may be included in the core 940.

CPUs 941, GPUs 942, FPGAs 943, and accelerators 944 may execute certain instructions that, in combination, may make up the aforementioned computer code. That computer code may be stored in ROM 945 or RAM 946. Transitional data may be also be stored in RAM 946, whereas permanent data may be stored for example, in the internal mass storage 947. Fast storage and retrieve to any of the memory devices may be enabled through the use of cache memory, that may be closely associated with one or more CPU 941, GPU 942, mass storage 947, ROM 945, RAM 946, and the like.

The computer readable media may have computer code thereon for performing various computer-implemented operations. The media and computer code may be those specially designed and constructed for the purposes of the present disclosure, or they may be of the kind well known and available to those having skill in the computer software arts.

As an example and not by way of limitation, the computer system having architecture 900, and specifically the core 940 may provide functionality as a result of processor(s) (including CPUs, GPUs, FPGA, accelerators, and the like) executing software embodied in one or more tangible, computer-readable media. Such computer-readable media may be media associated with user-accessible mass storage as introduced above, as well as certain storage of the core 940 that are of non-transitory nature, such as core-internal mass storage 947 or ROM 945. The software implementing various embodiments of the present disclosure may be stored in such devices and executed by core 940. A computer-readable medium may include one or more memory devices or chips, according to particular needs. The software may cause the core 940 and specifically the processors therein (including CPU, GPU, FPGA, and the like) to execute particular processes or particular parts of particular processes described herein, including defining data structures stored in RAM 946 and modifying such data structures according to the processes defined by the software. In addition or as an alternative, the computer system may provide functionality as a result of logic hardwired or otherwise embodied in a circuit (for example: accelerator 944), which may operate in place of or together with software to execute particular processes or particular parts of particular processes described herein. Reference to software may encompass logic, and vice versa, where appropriate. Reference to a computer-readable media may encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The above disclosure also encompasses the embodiments listed below:

(1) A method performed by at least one processor of an encoder, the method comprising: bounding a mesh via a bounding box that comprises a first bounding plane and a second bounding plane, in which the bounding box encloses the mesh; partitioning the mesh via a global symmetry plane that partitions the mesh into a first side and a second side, in which the global symmetry plane is perpendicular to the first bounding plane and the second bounding plane, and in which the second side is opposite of the first side in the mesh; dividing the mesh into a plurality of slices, each slice being perpendicular to the global symmetry plane; determining a local symmetry plane for each slice based on the global symmetry plane; based on a determination that a vertex merging condition is satisfied for a first slice from the plurality of slices that shares a boundary with a second slice from the plurality of slices, merging one or more vertices in the boundary of the second slice with one or more vertices in the boundary of the first slice; and encoding each slice from the plurality of slices as a respective sub-mesh of the mesh.

(2) The method of feature (1), in which each slice from the plurality of slices is equally spaced.

(3) The method of feature (1) or (2), in which at least one slice from the plurality of slices is recursively partitioned in equally spaced sub-slices until a stop condition is satisfied.

(4) The method of feature (3), in which the stop condition is satisfied based on a determination that a size of a sub-slice is less than a size threshold.

(5) The method of any one of features (1)-(4), in which a third slice from the plurality of slices is merged with a fourth slice from the plurality of slices based on a determination that a slice merging condition is satisfied.

(6) The method of feature (5), in which the slice merging condition is satisfied based on a determination that an angle between a local symmetry plane of the third slice and a local symmetry plane of the fourth slice is less than a threshold.

(7) The method of any one of features (1)-(6), in which the vertex merging condition is satisfied based on a determination that a distortion of the first slice is less than a distortion of a second slice.

(8) The method of feature (7), in which the distortion is a symmetry prediction error.

(9) The method of any one of features (1)-(8), in which the merging the one or more vertices in the boundary of the second slice with one or more vertices in the boundary of the first slice further comprises: merging a first vertex located on the first side in the boundary of the second slice with a second vertex located on the first side in the boundary of the first slice, and merging a third vertex located on the second side in the boundary of the second slice with a fourth vertex located on the second side in the boundary of the first slice, the third vertex corresponding to a predicted vertex that is symmetric to the first vertex, the fourth vertex corresponding to a predicted vertex that is symmetric to the second vertex.

(10) The method of any one of features (1)-(10), in which the encoding each slice from the plurality of slices as the respective sub-mesh of the mesh further comprises specifying, via a flag for each sub-mesh of the mesh, whether a boundary of the respective sub-mesh of the mesh is included in a bitstream.

(11) An encoder comprising: at least one memory configured to store program code; and at least one processor configured to read the program code and operate as instructed by the program code, the program code comprising: bounding code configured to cause the at least one processor to bound a mesh via a bounding box that comprises a first bounding plane and a second bounding plane, in which the bounding box encloses the mesh, partitioning code configured to cause the at least one processor to partition the mesh via a global symmetry plane that partitions the mesh into a first side and a second side, in which the global symmetry plane perpendicular to the first bounding plane and the second bounding plane, and in which the second side is opposite of the first side in the mesh, dividing code configured to cause the at least one processor to divide the mesh into a plurality of slices, each slice being perpendicular to the global symmetry plane, determining code configured to cause the at least one processor to determine a local symmetry plane for each slice based on the global symmetry plane, first merging code configured to cause the at least one processor to, based on a determination that a vertex merging condition is satisfied for a first slice from the plurality of slices that shares a boundary with a second slice from the plurality of slices, merge one or more vertices in the boundary of the second slice with one or more vertices in the boundary of the first slice, and encoding code configured to cause the at least one processor to encode each slice from the plurality of slices as a respective sub-mesh of the mesh.

(12) The encoder of feature (11), in which each slice from the plurality of slices is equally spaced.

(13) The encoder of feature (11) or (12), in which at least one slice from the plurality of slices is recursively partitioned in equally spaced sub-slices until a stop condition is satisfied.

(14) The encoder of feature (13), in which the stop condition is satisfied based on a determination that a size of a sub-slice is less than a size threshold.

(15) The encoder of any one of features (11)-(14), in which a third slice from the plurality of slices is merged with a fourth slice from the plurality of slices based on a determination that a slice merging condition is satisfied.

(16) The encoder of feature (15), in which the slice merging condition is satisfied based on a determination that an angle between a local symmetry plane of the third slice and a local symmetry plane of the fourth slice is less than a threshold.

(17) The encoder of any one of features (11)-(16), in which the vertex merging condition is satisfied based on a determination that a distortion of the first slice is less than a distortion of a second slice.

(18) The encoder of feature (17), in which the distortion is a symmetry prediction error.

(19) The encoder of any one of features (11)-(18), in which the first merging code further comprises: second merging code configured to cause the at least one processor to merge a first vertex located on the first side in the boundary of the second slice with a second vertex located on the first side in the boundary of the first slice, and third merging code configured to cause the at least one processor to merge a third vertex located on the second side in the boundary of the second slice with a fourth vertex located on the second side in the boundary of the first slice, the third vertex corresponding to a predicted vertex that is symmetric to the first vertex, the fourth vertex corresponding to a predicted vertex that is symmetric to the second vertex.

(20) A non-transitory computer readable medium having instructions stored therein, which when executed by a processor of an encoder, cause the processor to execute a method comprising: bounding a mesh via a bounding box that comprises a first bounding plane and a second bounding plane, in which the bounding box encloses the mesh; partitioning the mesh via a global symmetry plane that partitions the mesh into a first side and a second side, in which the global symmetry plane is perpendicular to the first bounding plane and the second bounding plane, and in which the second side is opposite of the first side of the mesh; dividing the mesh into a plurality of slices, each slice being perpendicular to the global symmetry plane; determining a local symmetry plane for each slice based on the global symmetry plane; based on a determination that a vertex merging condition is satisfied for a first slice from the plurality of slices that shares a boundary with a second slice from the plurality of slices, merging one or more vertices in the boundary of the second slice with one or more vertices in the boundary of the first slice; and encoding each slice from the plurality of slices as a respective sub-mesh of the mesh.

What is claimed is:

1. A method performed by at least one processor of an encoder, the method comprising:
    bounding a mesh via a bounding box that comprises a first bounding plane and a second bounding plane, wherein the bounding box encloses the mesh;
    partitioning the mesh via a global symmetry plane that partitions the mesh into a first side and a second side, wherein the global symmetry plane is perpendicular to the first bounding plane and the second bounding plane, and wherein the second side is opposite of the first side in the mesh;
    dividing the mesh into a plurality of slices, each slice being perpendicular to the global symmetry plane;
    determining a local symmetry plane for each slice based on the global symmetry plane;
    based on a determination that a vertex merging condition is satisfied for a first slice from the plurality of slices that shares a boundary with a second slice from the plurality of slices, merging one or more vertices in the boundary of the second slice with one or more vertices in the boundary of the first slice; and
    encoding each slice from the plurality of slices as a respective sub-mesh of the mesh.

2. The method of claim 1, wherein each slice from the plurality of slices is equally spaced.

3. The method of claim 1, wherein at least one slice from the plurality of slices is recursively partitioned in equally spaced sub-slices until a stop condition is satisfied.

4. The method of claim 3, wherein the stop condition is satisfied based on a determination that a size of a sub-slice is less than a size threshold.

5. The method of claim 1, wherein a third slice from the plurality of slices is merged with a fourth slice from the plurality of slices based on a determination that a slice merging condition is satisfied.

6. The method of claim 5, wherein the slice merging condition is satisfied based on a determination that an angle between a local symmetry plane of the third slice and a local symmetry plane of the fourth slice is less than a threshold.

7. The method of claim 1, wherein the vertex merging condition is satisfied based on a determination that a distortion of the first slice is less than a distortion of a second slice.

8. The method of claim 7, wherein the distortion is a symmetry prediction error.

9. The method of claim 1, wherein the merging the one or more vertices in the boundary of the second slice with one or more vertices in the boundary of the first slice further comprises:
- merging a first vertex located on the first side in the boundary of the second slice with a second vertex located on the first side in the boundary of the first slice, and
- merging a third vertex located on the second side in the boundary of the second slice with a fourth vertex located on the second side in the boundary of the first slice, the third vertex corresponding to a predicted vertex that is symmetric to the first vertex, the fourth vertex corresponding to a predicted vertex that is symmetric to the second vertex.

10. The method of claim 1, wherein the encoding each slice from the plurality of slices as the respective sub-mesh of the mesh further comprises specifying, via a flag for each sub-mesh of the mesh, whether a boundary of the respective sub-mesh of the mesh is included in a bitstream.

11. An encoder comprising:
- at least one memory configured to store program code; and
- at least one processor configured to read the program code and operate as instructed by the program code, the program code comprising:
  - bounding code configured to cause the at least one processor to bound a mesh via a bounding box that comprises a first bounding plane and a second bounding plane, wherein the bounding box encloses the mesh,
  - partitioning code configured to cause the at least one processor to partition the mesh via a global symmetry plane that partitions the mesh into a first side and a second side, wherein the global symmetry plane perpendicular to the first bounding plane and the second bounding plane, and wherein the second side is opposite of the first side in the mesh,
  - dividing code configured to cause the at least one processor to divide the mesh into a plurality of slices, each slice being perpendicular to the global symmetry plane,
  - determining code configured to cause the at least one processor to determine a local symmetry plane for each slice based on the global symmetry plane,
  - first merging code configured to cause the at least one processor to, based on a determination that a vertex merging condition is satisfied for a first slice from the plurality of slices that shares a boundary with a second slice from the plurality of slices, merge one or more vertices in the boundary of the second slice with one or more vertices in the boundary of the first slice, and
  - encoding code configured to cause the at least one processor to encode each slice from the plurality of slices as a respective sub-mesh of the mesh.

12. The encoder of claim 11, wherein each slice from the plurality of slices is equally spaced.

13. The encoder of claim 11, wherein at least one slice from the plurality of slices is recursively partitioned in equally spaced sub-slices until a stop condition is satisfied.

14. The encoder of claim 13, wherein the stop condition is satisfied based on a determination that a size of a sub-slice is less than a size threshold.

15. The encoder of claim 11, wherein a third slice from the plurality of slices is merged with a fourth slice from the plurality of slices based on a determination that a slice merging condition is satisfied.

16. The encoder of claim 15, wherein the slice merging condition is satisfied based on a determination that an angle between a local symmetry plane of the third slice and a local symmetry plane of the fourth slice is less than a threshold.

17. The encoder of claim 11, wherein the vertex merging condition is satisfied based on a determination that a distortion of the first slice is less than a distortion of a second slice.

18. The encoder of claim 17, wherein the distortion is a symmetry prediction error.

19. The encoder of claim 11, wherein the first merging code further comprises:
- second merging code configured to cause the at least one processor to merge a first vertex located on the first side in the boundary of the second slice with a second vertex located on the first side in the boundary of the first slice, and
- third merging code configured to cause the at least one processor to merge a third vertex located on the second side in the boundary of the second slice with a fourth vertex located on the second side in the boundary of the first slice, the third vertex corresponding to a predicted vertex that is symmetric to the first vertex, the fourth vertex corresponding to a predicted vertex that is symmetric to the second vertex.

20. A non-transitory computer readable medium having instructions stored therein, which when executed by a processor of an encoder, cause the processor to execute a method comprising:
- bounding a mesh via a bounding box that comprises a first bounding plane and a second bounding plane, wherein the bounding box encloses the mesh;
- partitioning the mesh via a global symmetry plane that partitions the mesh into a first side and a second side, wherein the global symmetry plane is perpendicular to the first bounding plane and the second bounding plane, and wherein the second side is opposite of the first side of the mesh;
- dividing the mesh into a plurality of slices, each slice being perpendicular to the global symmetry plane;
- determining a local symmetry plane for each slice based on the global symmetry plane;
- based on a determination that a vertex merging condition is satisfied for a first slice from the plurality of slices that shares a boundary with a second slice from the plurality of slices, merging one or more vertices in the boundary of the second slice with one or more vertices in the boundary of the first slice; and
- encoding each slice from the plurality of slices as a respective sub-mesh of the mesh.

* * * * *